(12) United States Patent
Inoue (10) Patent No.: US 8,720,305 B1
(45) Date of Patent: May 13, 2014

(54) BICYCLE PEDAL

(71) Applicant: Shimano Inc., Osaka (JP)

(72) Inventor: Akira Inoue, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/665,371

(22) Filed: Oct. 31, 2012

(51) Int. Cl.
*B62M 3/00* (2006.01)

(52) U.S. Cl.
USPC ........................................ 74/594.6

(58) Field of Classification Search
USPC .............. 74/560, 594.1, 594.4, 594.6; 36/131
See application file for complete search history.

(56) References Cited

U.S. PATENT DOCUMENTS

| | | | | |
|---|---|---|---|---|
| 5,003,841 A | * | 4/1991 | Nagano | 74/594.4 |
| 6,112,620 A | * | 9/2000 | Chen | 74/594.6 |
| 6,128,973 A | * | 10/2000 | Nagano | 74/594.6 |
| 6,170,357 B1 | * | 1/2001 | Chen | 74/594.6 |
| 6,324,941 B1 | * | 12/2001 | Ho | 74/594.6 |
| 6,490,948 B2 | * | 12/2002 | Tanaka | 74/594 |
| 6,857,337 B2 | * | 2/2005 | Shuman | 74/594.6 |
| 7,024,962 B2 | * | 4/2006 | Chen | 74/594.6 |
| 2005/0005729 A1 | * | 1/2005 | Chen | 74/594.6 |
| 2007/0193402 A1 | * | 8/2007 | Hsieh | 74/560 |

FOREIGN PATENT DOCUMENTS

EP 1219532 A2 7/2002

* cited by examiner

*Primary Examiner* — Vicky Johnson
(74) *Attorney, Agent, or Firm* — Global IP Counselors (57) ABSTRACT

A bicycle pedal includes a pedal axle, a main pedal body, a first cleat securing member and a first biasing member. The main pedal body is rotatably supported on the pedal axle. The first cleat securing member is pivotally coupled relative to the main pedal body about a first pivot axis between a clamping position and a release position. The first biasing member biases the first cleat securing member toward the clamping position. The first biasing member is supported on the main pedal body at a distance farther from a center longitudinal axis of the pedal axle than the first pivot axis.

21 Claims, 10 Drawing Sheets

BICYCLE PEDAL

BACKGROUND

1. Field of the Invention

This invention generally relates to a bicycle pedal. More specifically, the present invention relates to bicycle pedal that can be releasably attached to a cleat of a cycling shoe.

2. Background Information

A conventional clipless pedal that can connect to a cleat attached to a shoe is a known example of a bicycle pedal that can connect to a cycling shoe (e.g., European Patent Application Publication No. 1,219,532). When a clipless type bicycle pedal is used, the crank can be rotated during a down stroke as well by pulling upward. As a result, the crank can be rotated more efficiently.

A conventional clipless bicycle pedal includes a pedal axle that can be attached to a crank of a bicycle, a main pedal body rotatably supported on the pedal axle, and a coupling mechanism. The coupling mechanism is fixed to two opposite faces of the pedal main pedal body and has a first cleat securing member configured to couple with a front portion of a cleat and a second cleat securing member configured to couple with a rear portion of the cleat. The first cleat securing member is non-rotatably fixed to the main pedal body and the second cleat securing member is rotatably coupled to the main pedal body. The second cleat securing member is forced in a direction of coupling with a cleat by a torsion coil spring or other force exerting member.

With such a conventional bicycle pedal, a cleat disengagement operation is executed by pushing the heel of the shoe outward (twisting the shoe) while the shoe is coupled to the pedal. When the heel of the shoe is pushed outward, the second cleat securing member is rotated in a disengagement direction against the exerted force of the force exerting member. As a result, a front end of the cleat separates from the first cleat securing member and the shoe can be removed from the pedal.

SUMMARY

With such a conventional bicycle pedal, the pivot pin and the spring of the second cleat securing member (rotatably coupled to the main pedal body) are located relatively close to a pedal axle. With such an arrangement, mud tends to stick to around the center portion of a bicycle pedal (i.e. around a pedal axle) during riding in muddy conditions. Thus, in the conventional structure, mud tends to stick to the spring, which is relatively close to the pedal axle. Mud does not always come off easily from the bicycle pedal due to the shape and location of the spring relatively close to the pedal axle.

Accordingly, one object of this disclosure is to provide a bicycle pedal with improved mud clearing ability.

Also, with such a conventional bicycle pedal, if the biasing force of the spring is increased in order to prevent accidental disengagement of the cleat from the bicycle pedal during riding (i.e., to hold the cleat more securely during extreme riding), the step-in operation may become difficult for some riders due to increased force needed for step-in. On the other hand, if the biasing force of the spring is decreased in order to obtain an easier step-in operation, accidental disengagement of the cleat from the bicycle pedal may occur during riding such as during extreme off-road (mountain bike) riding. In other words, it can be difficult to obtain an ideal spring force during riding and for a relatively easy step-in operation for some riders.

Accordingly, another object of this disclosure is to provide a bicycle pedal, which facilitates a relatively easy step-in operation yet reduces the possibility accidental disengagement of the cleat from the bicycle pedal during riding.

In view of the state of the known technology, a bicycle pedal is provided that basically includes a pedal axle, a main pedal body, a first cleat securing member and a first biasing member. The main pedal body is rotatably supported on the pedal axle. The first cleat securing member is pivotally coupled relative to the main pedal body about a first pivot axis between a clamping position and a release position. The first biasing member biases the first cleat securing member toward the clamping position. The first biasing member is supported on the main pedal body at a distance farther from a center longitudinal axis of the pedal axle than the first pivot axis.

Other objects, features, aspects and advantages of the disclosed bicycle pedal will become apparent to those skilled in the art from the following detailed description, which, taken in conjunction with the annexed drawings, discloses preferred embodiments of the bicycle pedal.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
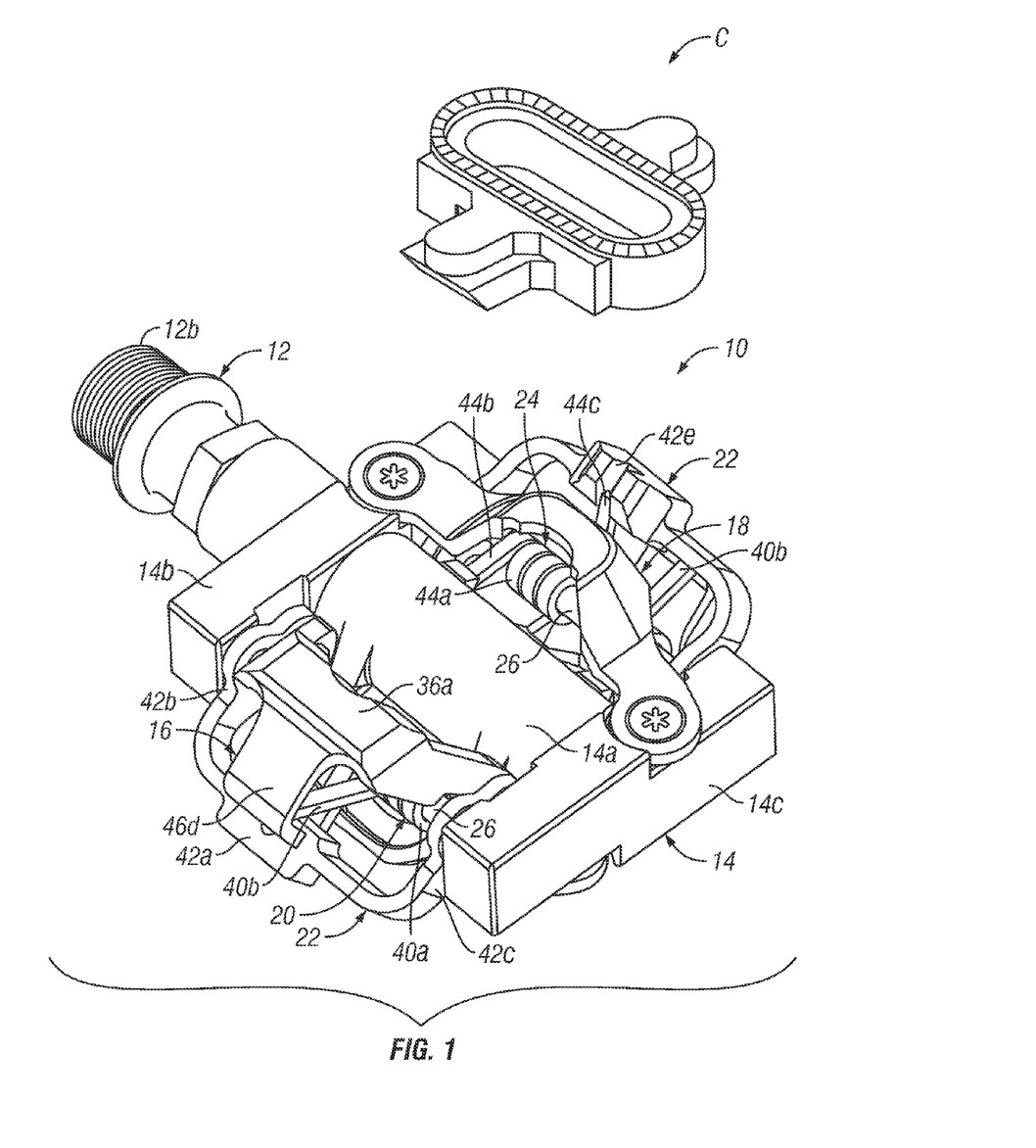
FIG. 1 is a perspective view of a bicycle pedal in accordance with a first embodiment.

Referring initially to FIG. 1, a bicycle pedal 10 is illustrated in accordance with a first embodiment. The bicycle pedal 10 basically includes a pedal axle 12, a main pedal body 14, a first cleat securing member 16 and a second cleat securing member 18. In the illustrated embodiment, the first cleat securing member 16 is a rear cleat securing member, while the second cleat securing member 18 is a front cleat securing member. In other words, in the illustrated embodiment, the second cleat securing member 18 is designed to engage a front portion of a conventional bicycle cleat C, while the first cleat securing member 16 is designed to engage a rear portion of the bicycle cleat C.

Referring to FIGS. 1-5, the first cleat securing member 16 is a movable cleat securing member that is biased by a first biasing member 20. The second cleat securing member 18 is preferably a fixed cleat securing member that is fixedly coupled to the main pedal body 14 using a pair of fasters (e.g., screws). Alternatively, the second cleat securing member 18 can be a movable cleat securing member as with the first cleat securing member 16. The second cleat securing member 18 coupled to the main pedal body 14 at a location spaced from the first cleat securing member 16 to define a cleat receiving area between the first and second cleat securing members 16 and 18.

In the illustrated embodiment, the bicycle pedal 10 is a two-sided pedal (e.g. mountain bicycle style), and thus, further includes an additional first cleat securing member 16 biased by an additional first biasing member 20 and an additional second cleat securing member 18. In the case of a one-sided pedal (e.g. road style), the pedal body 14 would be modified to only include one of the first cleat securing members 16, one of the second cleat securing members 18 and one of the first biasing members 20. With such a pedal, only one-side would be engageable with the bicycle cleat C.

As used herein, the additional first (rear) and second (front) cleat securing members can be considered to be third and fourth cleat securing members, which are identical to the first and second cleat securing members 16 and 18, respectively. In other words, the terms first second, third and fourth can be used to designate the first and second cleat securing members disposed on opposite sides of the main pedal body 14.

Referring to FIGS. 1-7, the pedal axle 12 includes a pedal support end 12a and an attachment end 12b. The main pedal body 14 is rotatably supported on pedal axle 12. Preferably, the main pedal body 14 is rotatably supported on the pedal support end 12a of the pedal axle 12 via bearings or the like in a conventional manner. The main pedal body 14 includes a transverse axle portion 14a, a longitudinally extending inner side portion 14b and a longitudinally extending outer side portion 14c. The axle portion 14a is rotatably supported on the pedal support end 12a of the pedal axle 12. The inner side portion 14b is fixed to the end of the axle portion 14a that is closest to the attachment end 12b of the pedal axle 12. The outer side portion 14c is fixed to the opposite end of the axle portion 14a.

Therefore, the main pedal body 14 is preferably an H-shaped member. The main pedal body 14 is constructed of lightweight rigid material (e.g., a metallic material). In the illustrated embodiment, the axle portion 14a, the inner side portion 14b and the outer side portion 14c are integrally formed together as a one-piece, unitary member. Due to the H-shaped configuration of the main pedal body 14 mounting spaces are provided at opposite longitudinal ends of the main pedal body 14 for mounting the first and second cleat securing members 16 and 18 therein, as explained below.

The first cleat securing member 16 is movably coupled relative to the main pedal body 14 about a first pivot axis X between a clamping position and a release position. Preferably, the first cleat securing member 16 is pivotally coupled relative to the main pedal body 14 about a first pivot axis X between a clamping position (FIGS. 4 to 7) and a release position (FIG. 9). Also a step-in position (FIG. 8) occurs between the clamping position and a release position when the first cleat securing member 16 is partially pivoted towards the release position. The first biasing member 20 biases the first cleat securing member 16 toward the clamping position. The first biasing member 20 is supported on the main pedal body 14 at a distance farther from a center longitudinal axis A of the pedal axle 12 than the first pivot axis X. The first biasing member 20 preferably includes at least one first torsion spring.

In this embodiment, each longitudinal end of the bicycle pedal 10 also preferably includes a sub-member 22, a second biasing member 24 and a support shaft 26, which are used in conjunction with one of the first cleat securing members 16. For the sake of convenience only the rear (first) parts coupled at one end of the main pedal body 14 will be discussed. The sub-member 22 is mounted on the main pedal body 14. In this embodiment, the sub-member 22 is movably coupled to the main pedal body 14 between a first position and a second position. The sub-member 22 is preferably pivotally mounted on the main pedal body 14 by the support shaft 26. The support shaft 26 defines a second pivot axis Y that is offset from the first pivot axis X. Thus, the sub-member 22 is pivotally coupled to the main pedal body 14 about the second pivot axis Y.

Referring still to FIGS. 1-7, the first cleat securing member 16 is pivotally mounted on the sub-member 22 about the first pivot axis X. Preferably, the first cleat securing member 16 is pivotally mounted to the sub-member 22 using a pivot axle 28. In the illustrated embodiment, the pivot axle 28 includes two pivot pins 30 (i.e., two separate axles). However, a single axle (not shown) can be used. In terms of removal of mud removal, two separate axles are more advantageous than a single axle. However, in comparison with the conventional structure, a single first pivot axle is still advantageous in terms of removal of mud because no biasing members are disposed on the pivot axle 28. In other words, the first and second biasing members 20 and 24 are not mounted on the pivot axle 28, but are mounted on the support shaft 26 disposed farther from the center longitudinal axis A of the pedal axle 12 than the pivot axle 28.

The support shaft 26 supports the first biasing member 20 on the main pedal body 14. The support shaft 26 extends through a coiled portion of the at least one first torsion spring. Since the sub-member 22 is pivotally coupled to the main pedal body, the first pivot axis X moves when the sub-member 22 moves about the second pivot axis Y. The second pivot axis Y is positioned at a distance farther from a center longitudinal axis A of the pedal axle 12 than the first pivot axis X.

The second biasing member 24 is supported on the main pedal body 14 by the support shaft 26. The second biasing member 24 biases the sub-member 22 toward a first position relative to the main pedal body 14. The second biasing member 24 preferably includes at least one second torsion spring. The support shaft 26 also extends through a coiled portion of the at least one second torsion spring. Therefore, the support shaft 26 supports the first and second biasing members 20 and 24 on the main pedal body 14 at a distance farther from the center longitudinal axis A of the pedal axle 12 than the first pivot axis X.

In the first embodiment, the sub-member 22 is moved from the first position toward a second position as the first cleat securing member 16 moves toward the release position from an intermediate position, which is located between the clamping position and the release position. The intermediate position occurs at the point that the first cleat securing member 16 contacts the sub-member 22 such that they move as a unit against the force of both the first and second biasing members 20 and 24.

This intermediate position can correspond to the step-in position in which the first cleat securing member 16 moves toward the release position just enough for the cleat C to be fully engaged with the first cleat securing member 16 during a step-in engagement by the rider. Alternatively, the step-in position can be at a point prior to the first cleat securing member 16 contacting the sub-member 22. In any case, preferably, the step-in position occurs before the force of the second biasing member 24 acts against the first cleat securing member 16 as the first cleat securing member 16 moves towards the release position.

Referring to FIGS. 1-9, the first cleat securing member 16, the first biasing member 20 the sub-member 22, the second biasing member 24, the support shaft 26 and the pivot axle 28 will now be explained in more detail.

The first cleat securing member 16 is constructed of a lightweight rigid material. The first cleat securing member 16 basically includes a cleat securing portion 36a, an inner attachment portion 36b, an outer attachment portion 36c and a projecting portion 36d. The cleat securing portion 36a, the inner attachment portion 36b, the outer attachment portion 36c and the projecting portion 36d are preferably fixed together to move as one. In the illustrated embodiment, the cleat securing portion 36a, the inner attachment portion 36b, the outer attachment portion 36c and the projecting portion 36d are preferably integrally formed together as a one-piece unitary member.

The cleat securing portion 36a is disposed between the inner attachment portion 36b and the outer attachment portion 36c to form a shallow U-shaped profile. The cleat securing portion 36a is contacted by the bicycle cleat C to move during step-in and release from the bicycle pedal 10. The cleat securing portion 36a also contacts the bicycle cleat C to couple the bicycle cleat C to the pedal 10. The inner attachment portion 36b and the outer attachment portion 36c are pivotally coupled to the sub-member 22 using the first pivot axle 28 (e.g. pivot pins 30). The projecting portion 36d projects rearward and downward in a substantially L-shaped configuration from the cleat securing portion 36a when the pedal 10 is in a normal riding (horizontal) orientation. See the left side of FIG. 4 for example.

The projecting portion 36d is preferably centered between the inner and outer longitudinal sides 14b and 14c of the main pedal body 14. The projecting portion 36d is sized and configured to contact the sub-member 22 when the first cleat securing member 16 moves from the clamping position to the intermediate position. More specifically, the projecting portion 36d contacts the sub-member 22 when the intermediate position is reached. The projecting portion 36d includes a slot 36e formed in a lower surface of a free end thereof, which engages the first biasing member 20, as explained below. A tab 36f extends from at least one of the inner and outer attachment portions 36b and 36c (preferably the outer attachment portion) to contact another part of the pedal 10 in the clamping position so that the first cleat securing member 16 will not rotate counter-clockwise beyond the clamping position (see FIG. 4). In the illustrated embodiment, the tab 36f contacts an opposed surface of the second cleat securing member 18 disposed at the same end of the main pedal body 14 (see FIGS. 3 and 4).

As mentioned above, the first biasing member 20 preferably includes a torsion spring. In the illustrated embodiment, the torsion spring includes a coiled portion 40a, an inner end portion 40b and an outer end portion 40c. The support shaft 26 extends through the coiled portion 40a. The inner end 40b extends from the coiled portion 40a and is received in the slot 36e of the projecting portion 36d of the first cleat securing member 16. The outer end 40c engages an abutment 14d of the axle portion 14a of the main pedal body 14. Thus, the first biasing member 20 biases the first cleat securing member 16 toward the clamping position from the release and intermediate positions. The first biasing member 20 is disposed on the outer part of the support shaft 26, i.e., the part closest to the outer longitudinal side 14c of the main pedal body 14.

The sub-member 22 is also constructed of a lightweight rigid material. The sub-member 22 basically includes a central portion 42a, an inner attachment portion 42b and an outer attachment portion 42c. The central portion 42a, the inner attachment portion 42b and the outer attachment portion 42c are preferably fixed together to move as one. In the illustrated embodiment, the central portion 42a, the inner attachment portion 42b and the outer attachment portion 42c are preferably integrally formed together as a one-piece unitary member.

The central portion 42a is disposed between the inner attachment portion 42b and the outer attachment portion 42c to form a shallow U-shaped profile. The central portion 42a is contacted by the projecting portion 36d of the first cleat securing member 16 at the intermediate position of the first cleat securing member 16, to move the sub-member 22 from a first position to a second position as the first cleat securing member 16 moves from the intermediate position to the release position during release of the bicycle cleat C from the bicycle pedal 10. The inner attachment portion 42b and the outer attachment portion 42c are pivotally coupled to the inner and outer longitudinal sides 14b and 14c of the main pedal body via the support shaft 26.

The central portion 42a includes an enlarged section 42d disposed closer to the inner longitudinal side 14b of the main pedal body 14. The enlarged section 42d is sized (i.e., is sufficiently wide in a transverse direction) to be contacted by the projecting portion 36d of the first cleat securing member 36 when the first cleat securing member 36 reaches the intermediate position. Thus, when the first cleat securing member 16 moves from the intermediate position to the release position, the sub-member 22 moves from a first position to a second position.

The enlarged section 42d includes a slot 42e formed in a lower surface of a free end thereof, which engages the second biasing member 24, as explained below. A tab 42f extends from at least one of the inner and outer attachment portions 42b and 42c (preferably the outer attachment portion 42c) to contact another part of the pedal 10 in the clamping position so that the sub-member 22 will not rotate counter-clockwise beyond the clamping position (see FIG. 4). In the illustrated embodiment, the tab 42f contacts an opposed surface of the second cleat securing member 18 disposed at the same end of the pedal body (see FIG. 4).

Figure 2:
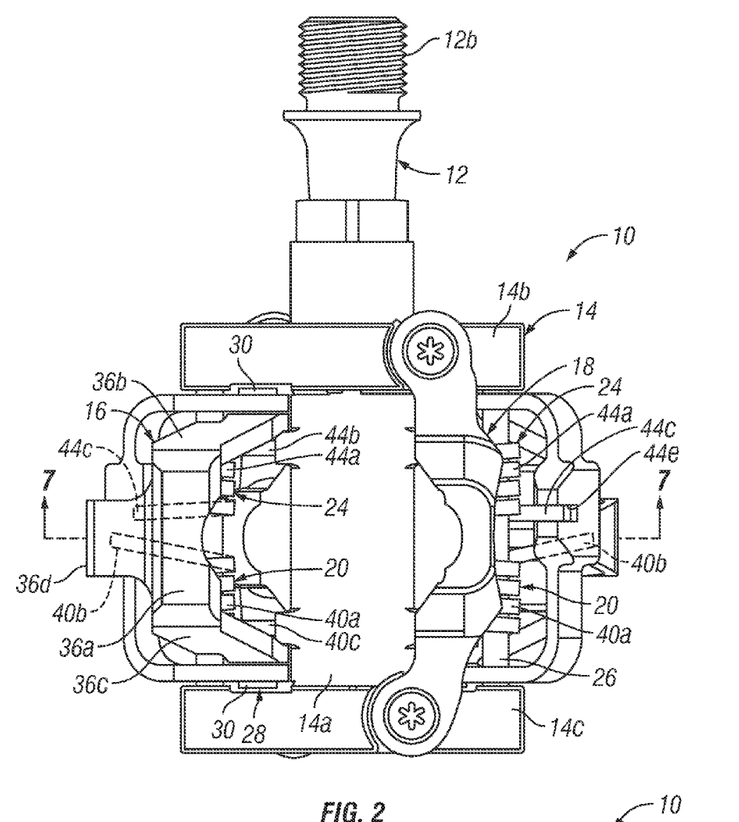
FIG. 2 is a top plan view of the bicycle pedal illustrated in FIG. 1.
Figure 3:
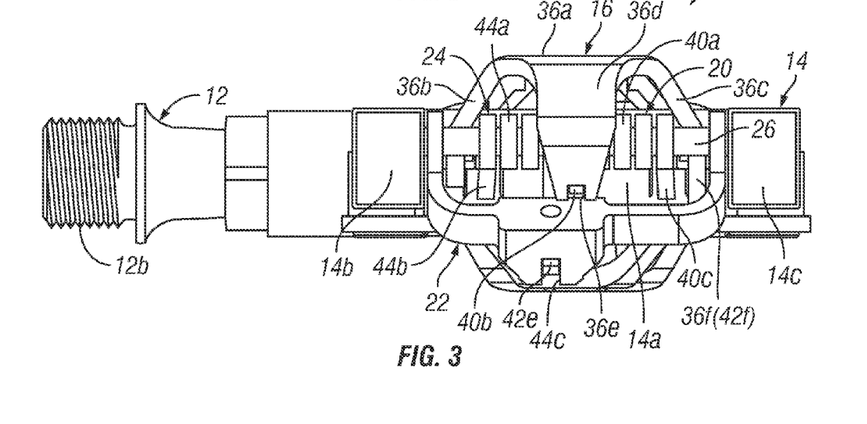
FIG. 3 is a rear end elevational view of the bicycle pedal illustrated in FIGS. 1 and 2.
Figure 4:
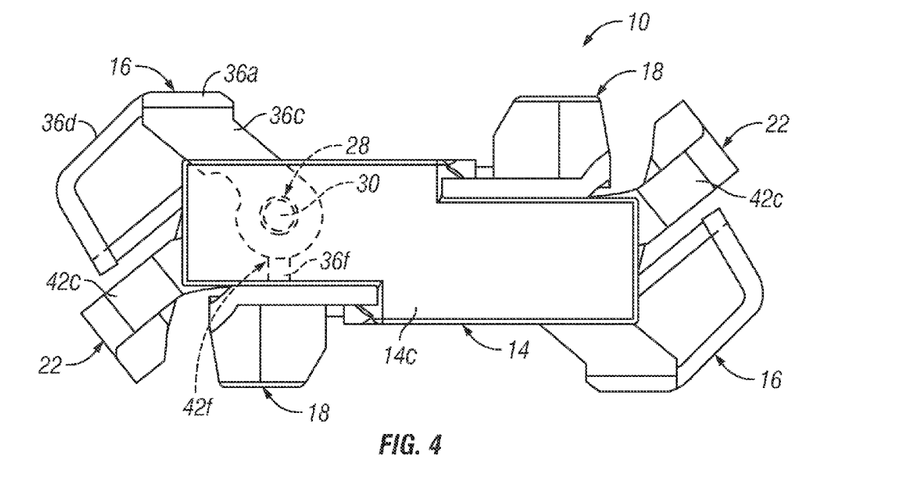
FIG. 4 is an outside elevational view of the bicycle pedal illustrated in FIGS. 1-3.
Figure 5:
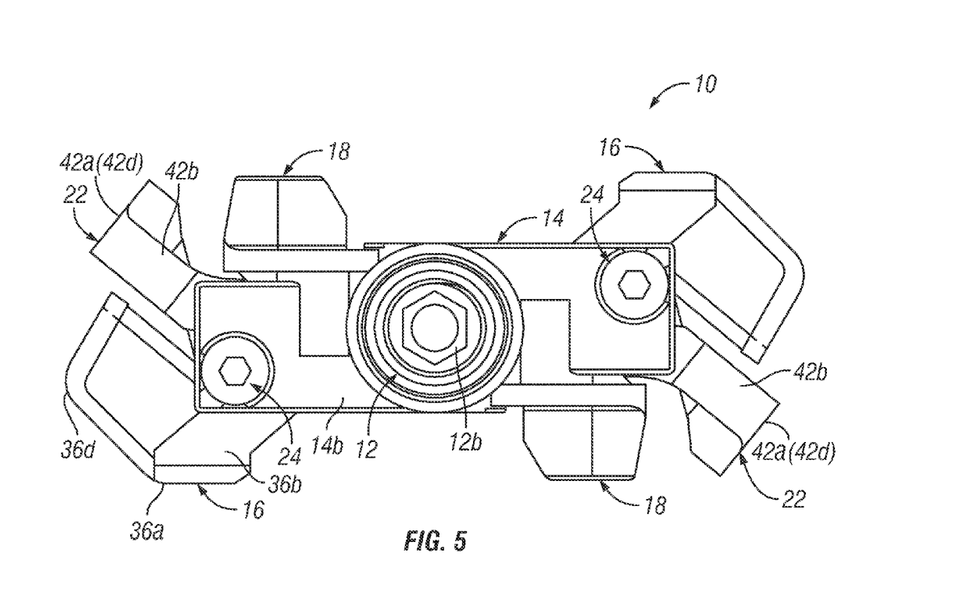
FIG. 5 is an inside elevational view of the bicycle pedal illustrated in FIGS. 1-4.

As mentioned above, the second biasing member 24 preferably includes a torsion spring. In the illustrated embodiment, the torsion spring includes a coiled portion 44a, an inner end portion 44b and an outer end portion 44c. The support shaft 26 extends through the coiled portion 44a. The outer end 44c extends from the coiled portion 44a and is received in the slot 42e of the enlarged section 42d of the sub-member 22. The inner end 44b engages the abutment 14d of the axle portion 14a of the main pedal body 14. Thus, the second biasing member 24 biases the sub-member 22 toward the first position from the second position. The second biasing member 40 is disposed on the inner part of the support shaft 26, i.e., the part closest to the inner longitudinal side 14b of the main pedal body 14. As seen in FIGS. 2-3 the outer end portion 44c of the second biasing member 24 is disposed closer to the to the inner longitudinal side 14b of the main pedal body 14 than the inner end portion 40b of the first biasing member 20 and engages another abutment 14d.

Figure 6:
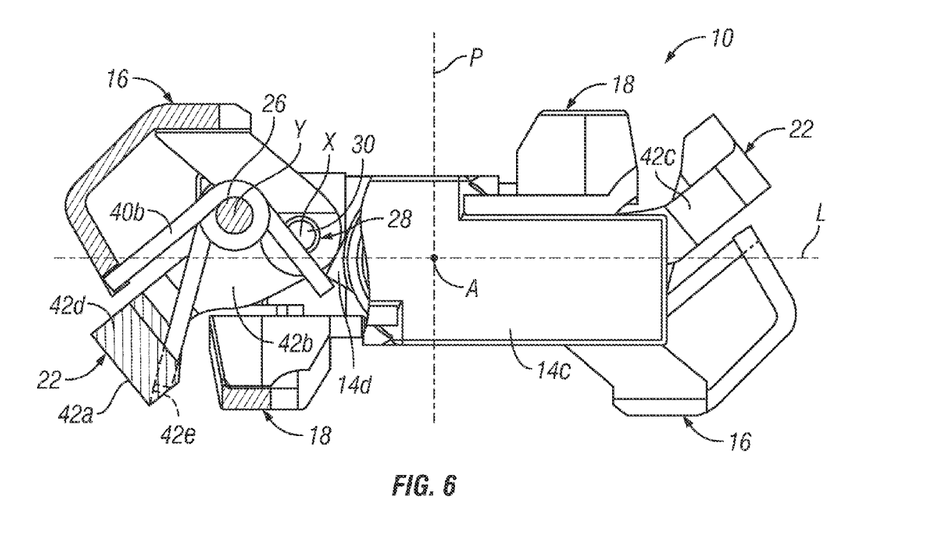
FIG. 6 is an outside elevational view of the bicycle pedal illustrated in FIGS. 1-5, with portions broken away for the purpose of illustration.

Referring to FIG. 6, the locations of the first and second pivot axes X and Y relative to the center longitudinal axis A of the pedal axle 12 will now be explained in more detail. A longitudinal plane L passes through the center longitudinal axis A at identical locations at both longitudinal ends of the pedal 10 to bisect the pedal 10 into like (upper and lower) halves. Similarly, a cross plane P, perpendicular to the longitudinal plane L, passes through the center longitudinal axis A at identical (upper and lower) locations of the pedal 10. The first pivot axis X is closer to both planes L and P than the second pivot axis Y. Thus, the second pivot axis Y is located further from both planes L and P than the first pivot axis X. Also, both the first and second pivot axes X and Y are disposed in the same quadrant, of the four quadrants formed by the intersection of the planes L and P. In the illustrated embodiment, the second pivot axis Y is located about 1.5 times further from the plane P than the first pivot axis X, and the second pivot axis Y is located about 2 times further from the plane L than the first pivot axis X.

Figure 7:
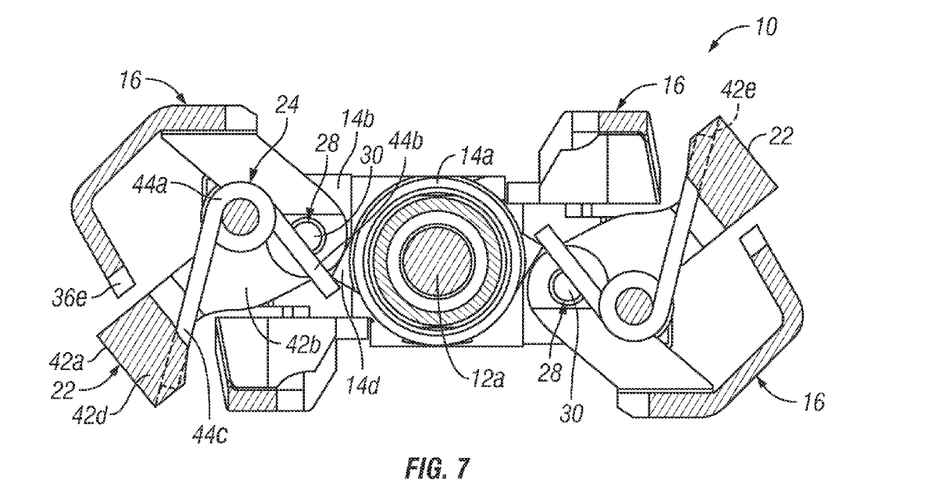
FIG. 7 is a cross-sectional view of the bicycle pedal illustrated in FIGS. 1-6, as viewed along section line 7-7 of FIG. 2, with the first cleat securing member moved in a clamping position and the sub-member in a first position.
Figure 8:
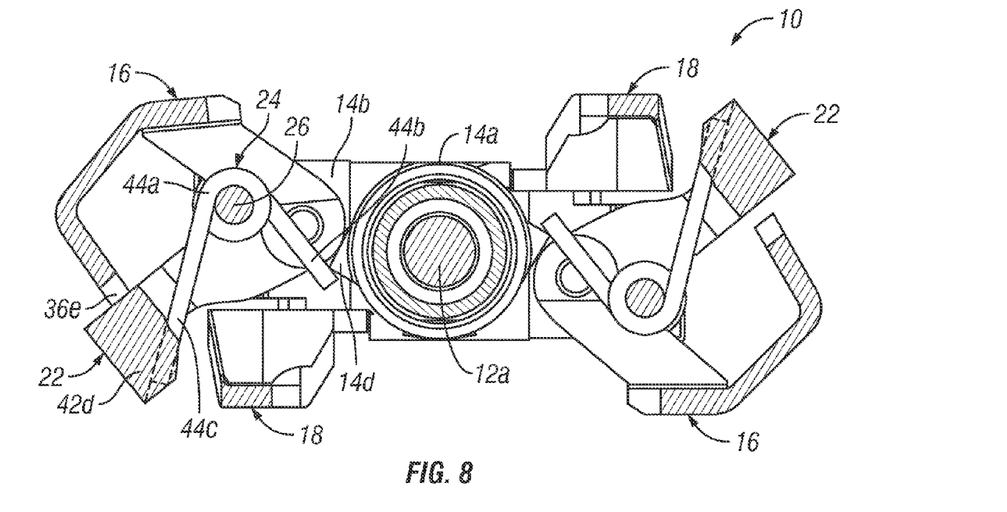
FIG. 8 is a cross-sectional view of the bicycle pedal illustrated in FIGS. 1-6, as viewed along section line 7-7 of FIG. 2, with the first cleat securing member moved from the clamping position to an intermediate position and the sub-member in a first position.
Figure 9:
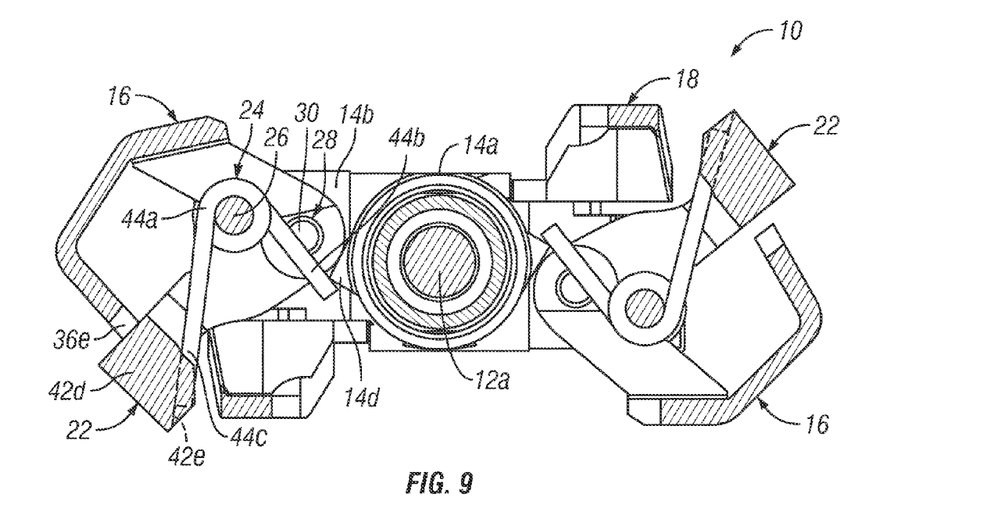
FIG. 9 is a cross-sectional view of the bicycle pedal illustrated in FIGS. 1-6, as viewed along section line 7-7 of FIG. 2, with the first cleat securing member moved from the intermediate position to a release position and the sub-member moved from the first position to a second position.

Referring now to FIGS. 7-9, step in and release from the bicycle pedal 10 will now be explained in more detail.

During a step-in operation (an operation where the rider clips the cleat of the shoe into the pedal 10), the first cleat securing member 16 pivotally rotates around the first pivot axis X against the first biasing force of the first biasing member 20 until the first cleat securing member 16 contacts the sub-pivoting member. This operation is shown in FIGS. 7-8. In FIG. 7, the clamping position of the first cleat securing member 16 is shown. When the rider steps into the pedal 10, the first cleat securing member 16 moves from the clamping position shown in FIG. 7 to the intermediate position shown in FIG. 8 against the first biasing force of the first biasing member 20. When the first cleat securing member 16 is in the intermediate position, which in the illustrated embodiment is also the step-in position, the cleat C of the shoe can move under the first cleat securing member 16. Then the first cleat securing member 16 will move back to the clamping position shown in FIG. 7 due to the biasing force of the first biasing member 20 to secure the cleat C. During this step-in operation, the first cleat securing member 16 may contact the sub-member 22, but the sub-member 22 does not need to move in order for the rider to step-in. Thus, during this step-in operation, the first pivot axis X preferably remains stationary. Due to this arrangement, a relatively easy (light) step-in operation can be obtained because only the first biasing force is exerted on the first cleat securing member 16 during the step-in operation.

During a release operation (an operation where the rider releases the cleat of the shoe from the pedal 10), the rider pushes the heel of the shoe outward (twists the shoe) while the shoe is coupled to the pedal 10 in a conventional manner via the cleat C. When the heel of the shoe is pushed outward, the cleat C will first move (rotate) the first cleat securing member 16 from the clamping position shown in FIG. 7 to the intermediate position shown in FIG. 8 against the biasing force of the first biasing member 20. At this point, the first cleat securing member 16 contacts the sub-member 22. However, at this point, the first cleat securing member 16 has not moved enough to release the cleat C from the pedal 10 while using a twisting motion of the cleat C. Rather, the first cleat securing member 16 continues to move (rotate) from the intermediate position shown in FIG. 8 to the release position shown in FIG. 9 against the biasing force of the first and second biasing members 20 and 24. In particular, during this portion of the cleat releasing movement, the first cleat securing member 16 has contacted the sub-member 22 so the sub-member 22 will move from the first position shown in FIG. 8 to the second position shown in FIG. 9 against the biasing force of the second biasing member 24. Therefore, additional force is required to move the first cleat securing member 16 from the intermediate position to the release position in which the cleat C can be released. Consequently, more force is required to release the cleat of the shoe from the pedal 10 than to step into the pedal 10. Once the first cleat securing member 16 reaches the release position shown in FIG. 9, the cleat C will release from the first cleat securing member 16. Once the cleat C is released, the first cleat securing member 16 and the sub-member 22 will return back to their original rest positions from the release position, due to the biasing forces of the first and second biasing members 20 and 24. Due to this arrangement, accidental disengagement of the cleat C from the bicycle pedal 10 can still be reduced during riding because the first and second biasing forces are exerted to completely disengage the cleat C from the bicycle pedal 10.

Second Embodiment

Referring now to FIGS. 10-18, a bicycle pedal 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, the descriptions and illustrations of the first embodiment also apply to this second embodiment, except as explained and illustrated herein. Furthermore, it will be apparent from this disclosure that parts of this embodiment that are identical or functionally identical will be given the same reference numerals as the first embodiment but with "100" added thereto.

The bicycle pedal 110 is similar to the bicycle pedal 10, except it includes a modified sub-member 122, an adjustment mechanism 150 is included, and first and second biasing members 120 and 124 both apply their urging force to a first cleat securing member 116 via the adjustment mechanism 150. The bicycle pedal 110 is also used with the cleat C of FIG. 1. These and other minor differences are discussed below and illustrated in the drawings.

Figure 10:
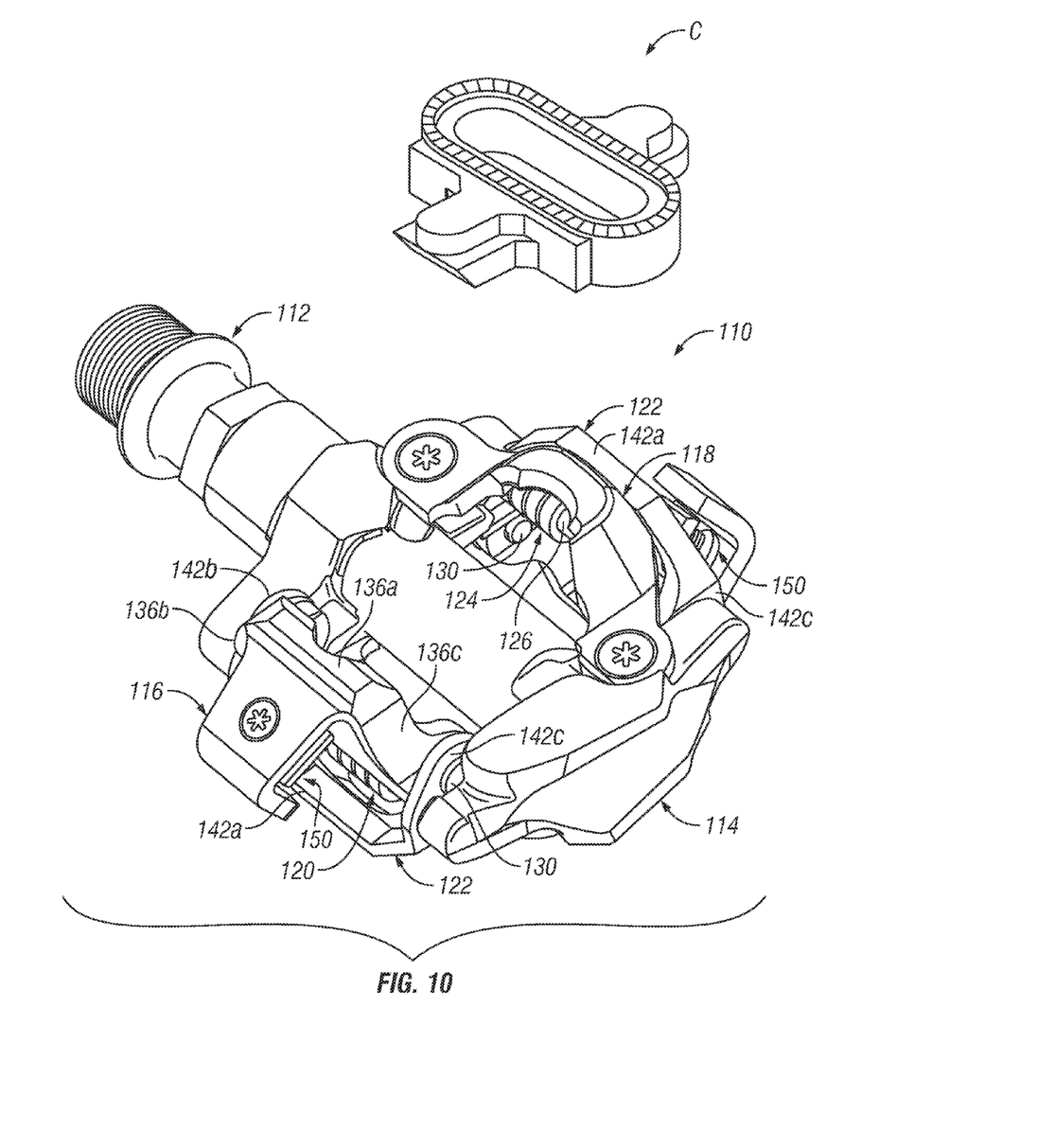
FIG. 10 is a perspective view of a bicycle pedal in accordance with a second embodiment.
Figure 11:
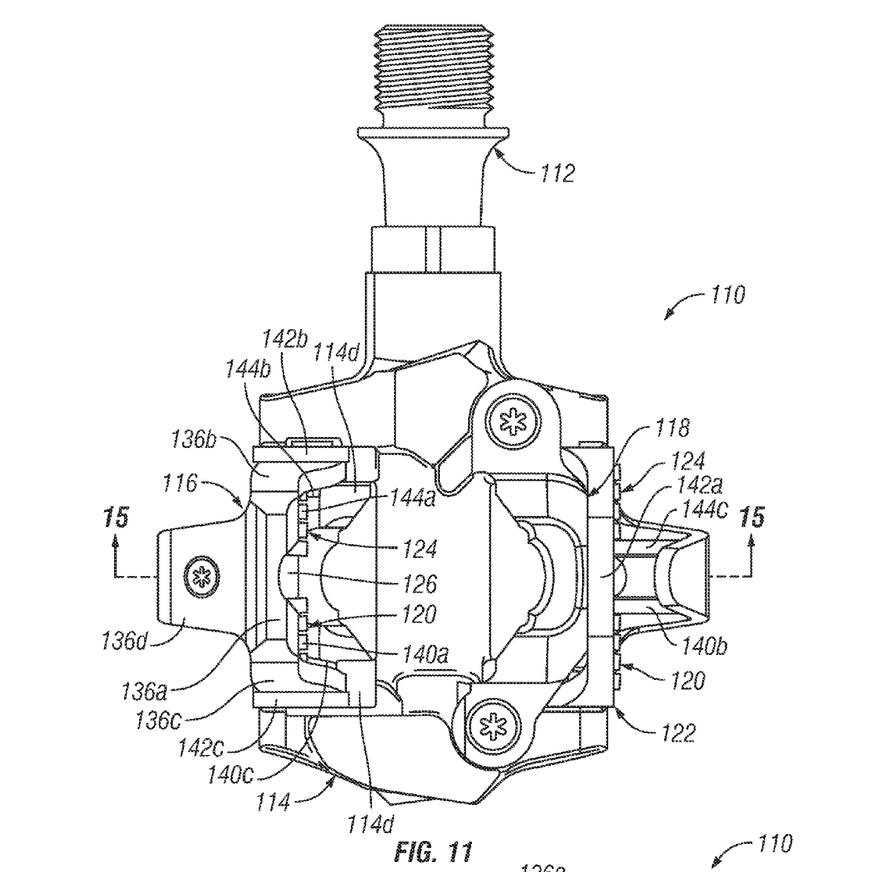
FIG. 11 is a top plan view of the bicycle pedal illustrated in FIG. 10.
Figure 12:
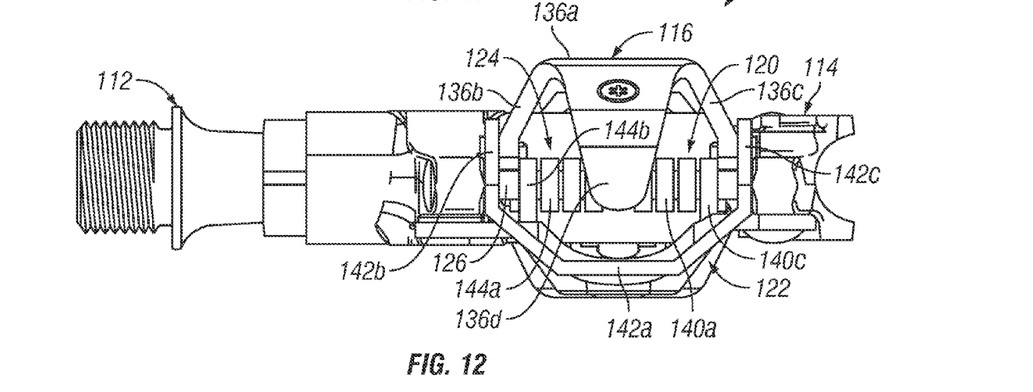
FIG. 12 is a rear end elevational view of the bicycle pedal illustrated in FIGS. 10 and 11.
Figure 13:
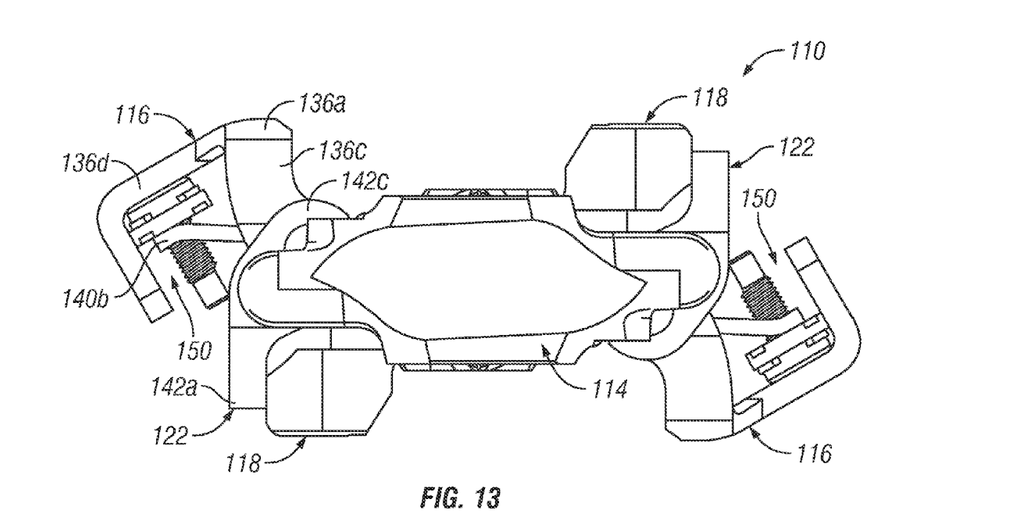
FIG. 13 is an outside elevational view of the bicycle pedal illustrated in FIGS. 10-12.
Figure 14:
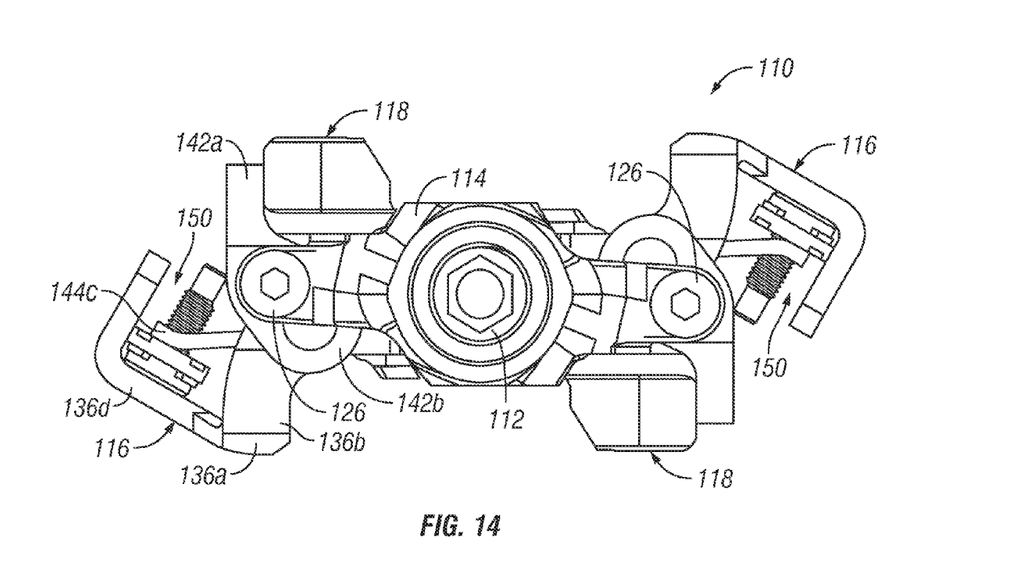
FIG. 14 is an inside elevational view of the bicycle pedal illustrated in FIGS. 10-13.

Referring to initially to FIG. 10, the bicycle pedal 110 basically includes a pedal axle 112, a main pedal body 114, the first cleat securing member 116 and a second cleat securing member 118. In the second illustrated embodiment, the first cleat securing member 116 is a rear cleat securing member, while the second cleat securing member 118 is a front cleat securing member.

Referring to FIGS. 10-14, the first cleat securing member 116 is a movable cleat securing member biased by both the first biasing member 120 and the second biasing member 124. The second cleat securing member 118 is preferably a fixed cleat securing member substantially identical to the second cleat securing member 18 of the first embodiment. The second cleat securing member 118 is coupled to the main pedal body 114 at a location spaced from the first cleat securing member 116 to define a cleat receiving area between the first and second cleat securing members 116 and 118.

Like the first embodiment, the bicycle pedal 110 is a two-sided pedal (e.g. mountain bicycle style), and thus, further includes an additional first cleat securing member 116 biased by additional first and second biasing members 120 and 124 and an additional second cleat securing member 118. In the case of a one-sided pedal (e.g. road style), the main pedal body 114 would be modified to only include one of the first cleat securing members 116, one of the second cleat securing members 118 and one each of the first and second biasing members 120 and 124. With such a pedal, only one-side would be engageable with the bicycle cleat C.

As used herein, the additional first (rear) and second (front) cleat securing members can be considered to be third and fourth cleat securing members, which are identical to the first and second cleat securing members 116 and 118, respectively. In other words, the terms first second, third and fourth can be used to designate the first and second cleat securing members disposed on opposite sides of the main pedal body 114.

Referring to FIGS. 10-16, like the first embodiment, the first cleat securing member 116 is movably (preferably pivotally) coupled relative to the main pedal body 114 about a first pivot axis X' between a clamping position and a release position. The first and second biasing members 120 and 124 are supported on the main pedal body 114 at a distance farther from a center longitudinal axis A' of the pedal axle 112 than the first pivot axis X'.

In this embodiment, each longitudinal end of the bicycle pedal 10 also preferably includes a modified sub-member 122, the second biasing member 124 and a support shaft 126 used in conjunction with one of the first cleat securing members 116. For the sake of convenience only the rear (first) parts coupled at one end of the main pedal body 114 will be discussed. In this embodiment, the sub-member 122 is non-movably mounted to the main pedal body 114 using the support shaft 126. The support shaft 126 defines a second pivot axis Y' that is offset from the first pivot axis X' like the first embodiment. The first and second biasing members 120 and 124 are disposed on the support shaft 126, i.e., about the second pivot axis Y'.

Referring to FIGS. 10-16, the first cleat securing member 116 is pivotally mounted on the sub-member 122 about the first pivot axis X'. Because the sub-member 122 is non-movable relative to the main pedal body 114, the first pivot axis X' is also non-movable relative to the main pedal body 114. Preferably, the first cleat securing member 116 is pivotally mounted to the sub-member 122 using a pivot axle 128. In the illustrated embodiment, the pivot axle 128 includes two pivot pins 130 (i.e., two separate axles) like the first embodiment. The first and second biasing members 120 and 124 preferably include first and second torsion springs, respectively. The support shaft 126 extends through coiled portions of the first and second torsion springs to support the first and second biasing members 120 and 124 on the support shaft 126.

Since the first and second biasing members 120 and 124 both apply their biasing forces to the first cleat securing member 116, the first cleat securing member 116 moves against both biasing forces during step in (movement from the clamping position to an intermediate position) and during release (movement from the clamping position through the intermediate position (i.e., the step-in position) to the release position.

Referring to FIGS. 15 to 18, the first cleat securing member 116, the first biasing member 120 the sub-member 122, the second biasing member 124, the support shaft 126 and the pivot axle 128 will now be explained in more detail.

The first cleat securing member 116 basically includes a cleat securing portion 136a, an inner attachment portion 136b and an outer attachment portion 136c and a projecting portion 136d. The projecting portion 136d has a hole configured to receive part of the (tension) adjustment mechanism 150. The adjustment mechanism 150 is preferably conventional, and constructed in accordance with U.S. Pat. No. 6,446,529, assigned to Shimano Inc. The first and second biasing members 120 and 124 engage the adjustment mechanism 150 to adjustably bias the first cleat securing member 116 toward the clamping position.

Figure 15:
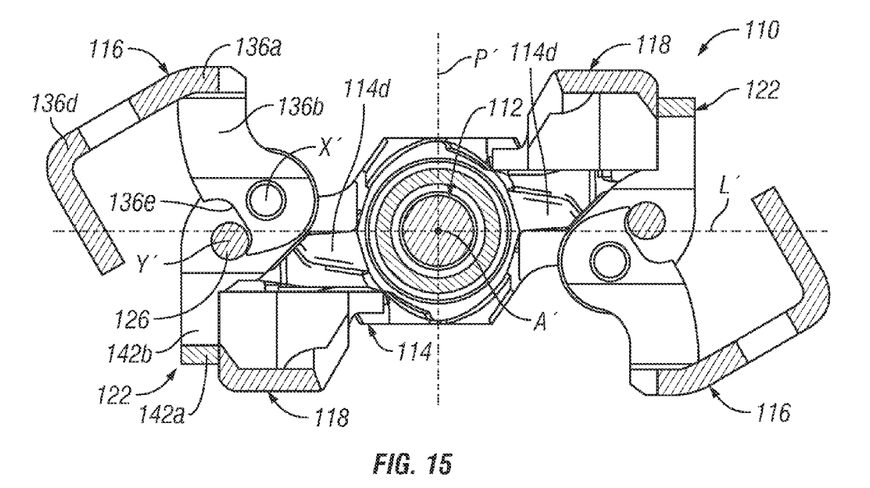
FIG. 15 is a cross-sectional view of the bicycle pedal illustrated in FIGS. 10-14, as viewed along section line 15-15 of FIG. 11, with the biasing members and adjustment mechanisms removed for the purpose of illustration.

Referring to FIG. 15, the inner attachment portion 136b preferably includes a cutout 136e which is sized and configured to contact the support shaft 126 in the clamping position (as shown in FIG. 15), and in the release position (not shown). Thus, the tab 136e of the first embodiment is eliminated in this second embodiment.

As mentioned above, the first biasing member 120 preferably includes a torsion spring. In the second embodiment, the torsion spring includes a coiled portion 140a, an inner end portion 140b and an outer end portion 140c. The support shaft 126 extends through the coiled portion 140a. The inner end 140b extends from the coiled portion 140a and contacts part of the adjustment mechanism 150. The outer end 140c engages an abutment 114d of the main pedal body 114.

Figure 18:
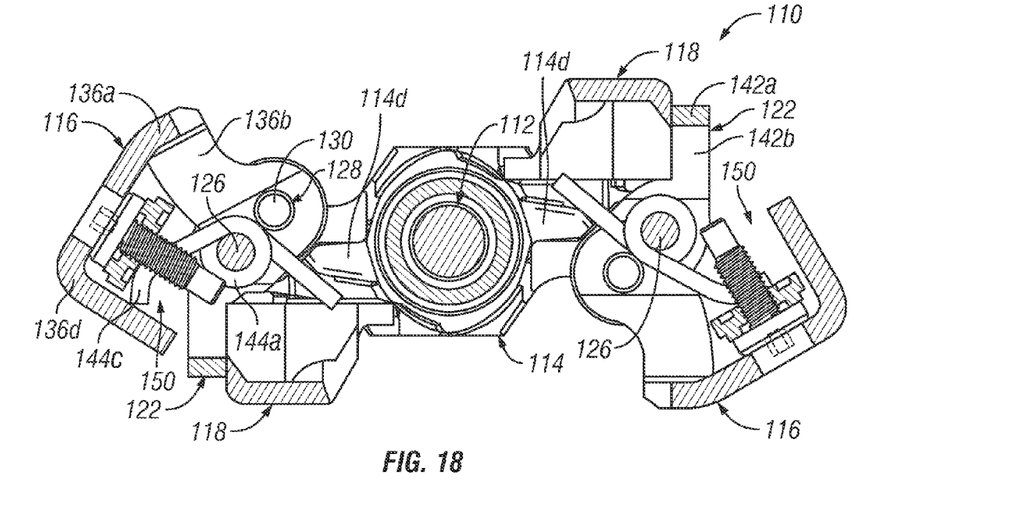
FIG. 18 is a cross-sectional view of the bicycle pedal illustrated in FIGS. 10-14, as viewed along section line 15-15 of FIG. 11, with the first cleat securing member moved from the intermediate position to a release position.

The sub-member 122 basically includes a central portion 142a, an inner attachment portion 142b and an outer attachment portion 142c. The central portion 142a, the inner attachment portion 142b and the outer attachment portion 142c are preferably fixed together as a one-piece, unitary member. The inner attachment portion 142b and the outer attachment portion 142c are non-movably coupled to the inner and outer longitudinal sides of the main pedal body 114 via the support shaft 126. Here, in this second embodiment, the first cleat securing member 116 does not contact the central portion 142a as the first cleat securing member 116 moves towards the release position. Rather, as seen in FIG. 18, the first cleat securing member 116 stops prior to contacting the central portion 142a due to the configuration of the cutout 136e.

Since the sub-member 122 does not need to rotate around the support shaft 126 in this embodiment (i.e., the pivot axis X' remains stationary), it is possible to pivotally mount the first cleat securing member 116 directly to the main pedal body and eliminate the sub-member 122 without losing the mud-clearing advantage of this embodiment. However, including the sub-member 122 to function as "a housing" to support the first pivot axle 130 and the first cleat securing member 116 facilitates easier manufacture and/or assembly as compared to directly mounting to the main pedal body.

Also, by utilizing the sub-member 122 as a housing support, the pedal 110 can be lighter because the main pedal body 114 will not receive a heavy load from the first cleat securing member 116. Rather, the sub-member 122 will receive the heavy load. Since the sub-member 122 is a smaller part, a more rigid (and heavier) material can be used for the sub-member 122 than the main pedal body 114. But the sub-member 122 is relatively small so weight is not increased substantially. This is also an advantage with the structure of the first embodiment.

As mentioned above, the second biasing member 124 preferably includes a torsion spring. In the illustrated embodiment, the torsion spring includes a coiled portion 144a, an inner end portion 144b and an outer end portion 144c. The support shaft 126 extends through the coiled portion 144a. The outer end 144c extends from the coiled portion 144a contacts part of the adjustment mechanism 150. The inner end 144b engages another abutment 114d of the main pedal body 114.

Referring to FIG. 15 the locations of the first and second pivot axes X' and Y' relative to the center longitudinal axis A' of the pedal axle 112 will now be explained in more detail. A longitudinal plane L' passes through the center longitudinal axis A' at identical locations at both longitudinal ends of the pedal 110 to bisect the pedal 110 into like (upper and lower) halves. Similarly, a cross plane P', perpendicular to the longitudinal plane L', passes through the center longitudinal axis A at identical (upper and lower) locations of the pedal 110. The first pivot axis X' is closer the plane P' than the second pivot axis Y'. However, the first pivot axis X' is further from the plane L' than the second pivot axis Y'. Also, the first and second pivot axes X' and Y' are disposed in different quadrants, of the four quadrants formed by the intersection of the planes L' and P'. In the illustrated embodiment, the second pivot axis Y' is located about 1.2 times further from the P' than the first pivot axis X', and the second pivot axis X' is located about two times further from the plane L' than the first pivot axis Y'.

Figure 16:
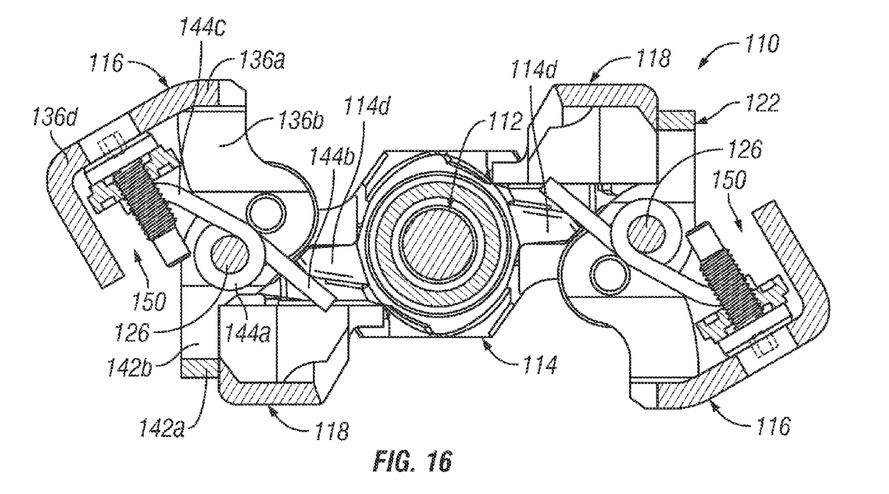
FIG. 16 is a cross-sectional view of the bicycle pedal illustrated in FIGS. 10-14, as viewed along section line 15-15 of FIG. 11, with the first cleat securing member moved in a clamping position.
Figure 17:
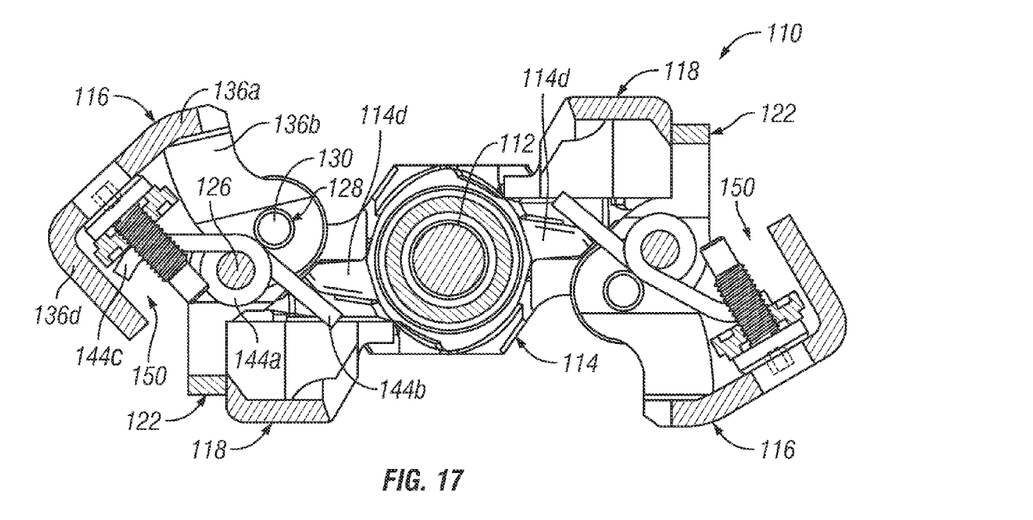
FIG. 17 is a cross-sectional view of the bicycle pedal illustrated in FIGS. 10-14, as viewed along section line 15-15 of FIG. 11, with the first cleat securing member moved from the clamping position to an intermediate position.

Referring to FIGS. 16-18, step in and release from the bicycle pedal 110 will now be explained in more detail. During a step-in operation (an operation where the rider clips the cleat C of the shoe into the pedal 110), the first cleat securing member 116 pivotally rotates around the (stationary) first pivot axis X' against the first biasing forces of the first and second biasing members 120 and 124 until the first cleat securing member 116 reaches the intermediate position. In FIG. 16, the clamping position of the first cleat securing member 116 is shown. In FIG. 17, the intermediate position of the first cleat securing member 116 is shown. When the first cleat securing member 116 is in the intermediate position, the cleat C of the shoe can move under the first cleat securing member 116. Then the first cleat securing member 116 will move back to the clamping position shown in FIG. 16 due to the biasing forces of the first and second biasing members 120 and 124 to secure the cleat C.

During a release operation (an operation where the rider releases the cleat C of the shoe from the pedal 110), the rider pushes the heel of the shoe outward (twists the shoe) while the shoe is coupled to the pedal in a conventional manner. When the heel of the shoe is pushed outward, the first cleat securing member 116 first moves (rotates) from the clamping position shown in FIG. 16 to the intermediate position shown in FIG. 17 against the first and second biasing members 120 and 124. However, at this point, the first cleat securing member 116 has not moved enough to release the cleat from the pedal 110. Rather, the first cleat securing member 116 continues to move from the intermediate position shown in FIG. 17 to the release position shown in FIG. 18. During this movement, the first cleat securing member 116 will again move against the first and second biasing members 120 and 124. Once the first cleat securing member 116 reaches the release position shown in FIG. 18, the cleat will release from the first cleat securing member 116. Once the cleat is released, the first cleat securing member 116 will move back to clamping position (through the intermediate position) due to the first and second biasing members 120 and 124.

With the pedal 110 of this second embodiment, the tension applied to the first cleat securing member 116 is adjustable to attain the desired releasing force for releasing the cleat C. Moreover, with the pedal 110 of this second embodiment, both of the first and second biasing members 120 and 124 apply their biasing forces to the first cleat securing member 116 throughout movement from the clamping position to the release position. Thus, in this embodiment, the advantage of "mud removal" can be obtained because the first and second biasing members 120 and 124 are disposed on the support shaft 126 which is located relatively far from the pedal axle 112. i.e., further than the pivot axle 128.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed (e.g., manufacturing tolerances).

Also it will be understood that although the terms "first", "second", "third" and "fourth" may be used herein to describe various components these components should not be limited by these terms. These terms are only used to distinguish one component from another. Thus, for example, a first component discussed above could be termed a second component and vice-a-versa without departing from the teachings of the present invention.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle pedal comprising:
   a pedal axle;
   a main pedal body rotatably supported on the pedal axle;
   a first cleat securing member pivotally coupled relative to the main pedal body about a first pivot axis between a clamping position and a release position;
   a support shaft attached to the pedal body, the support shaft having a longitudinal second axis non-movable relative to the pedal body; and
   a first biasing member biasing the first cleat securing member about the first pivot axis toward the clamping position, the first biasing member being supported on the support shaft, and the longitudinal second axis being located at a distance farther from a center longitudinal axis of the pedal axle than the first pivot axis.

2. The bicycle pedal according to claim 1, further comprising
   a sub-member mounted on the main pedal body, the first cleat securing member being pivotally mounted on the sub-member about the first pivot axis.

3. The bicycle pedal according to claim 1, further comprising
   a second cleat securing member coupled to the main pedal body at a location spaced from the first cleat securing member to define a cleat receiving area between the first and second cleat securing members.

4. The bicycle pedal according to claim 3, further comprising
   a third cleat securing member pivotally coupled relative to the main pedal body and biased to a clamping position; and
   a fourth cleat securing member coupled to the main pedal body at a location spaced from the third cleat securing member to define a cleat receiving area between the third and fourth cleat securing members.

5. A bicycle pedal comprising:
   a pedal axle;
   a main pedal body rotatably supported on the pedal axle;
   a first cleat securing member pivotally coupled relative to the main pedal body about a first pivot axis between a clamping position and a release position;
   a support shaft attached to the pedal body, the support shaft having a longitudinal second axis;
   a sub-member mounted on the support shaft to couple the sub-member to the main pedal body, the first cleat securing member being pivotally mounted on the sub-member about the first pivot axis; and
   a first biasing member biasing the first cleat securing member toward the clamping position about the first pivot axis, the first biasing member being supported on the support shaft, and the longitudinal second axis being located at a distance farther from a center longitudinal axis of the pedal axle than the first pivot axis,
   the support shaft supporting the first biasing member on the main pedal body.

6. The bicycle pedal according to claim 5, wherein
   the first biasing member includes at least one first torsion spring, the support shaft extends through the coiled portion of the at least one first torsion spring.

7. The bicycle pedal according to claim 5, wherein
   the sub-member is pivotally mounted on the support shaft to couple the sub-member to the main pedal body, the longitudinal second axis defines a second pivot axis that is offset from the first pivot axis.

8. The bicycle pedal according to claim 7, wherein
   the first biasing member includes at least one first torsion spring, the support shaft extends through a coiled portion of the at least one first torsion spring.

9. The bicycle pedal according to claim 7, further comprising
   a second biasing member supported on the main pedal body by the support shaft, the second biasing member biasing the sub-member toward a first position relative to the main pedal body, and
   the sub-member being moved from the first position toward a second position in response to movement of the first cleat securing member toward the release position from an intermediate position, which is located between the clamping position and the release position.

10. The bicycle pedal according to claim 9, wherein
    the first biasing member includes at least one first torsion spring, the support shaft extends through a coiled portion of the at least one first torsion spring; and
    the second biasing member includes at least one second torsion spring, the support shaft extends through a coiled portion of the at least one second torsion spring.

11. A bicycle pedal comprising:
    a pedal axle;
    a main pedal body rotatably supported on the pedal axle;
    a first cleat securing member movably coupled relative to the main pedal body about a first pivot axis between a clamping position and a release position;
    a first biasing member biasing the first cleat securing member toward the clamping position;
    a sub-member movably coupled to the main pedal body between a first position and a second position; and
    a second biasing member biasing the sub-member toward the first position relative to the main pedal body,
    the sub-member being stationary in response to movement of the first cleat securing member from the clamping position to an intermediate position between the clamping position and the release position, and
    the sub-member being moved from the first position toward the second position in response to movement of the first cleat securing member toward the release position from the intermediate position.

12. The bicycle pedal according to claim 11, wherein
    the sub-member is pivotally coupled to the main pedal body about a second pivot axis.

13. The bicycle pedal according to claim 12, wherein
    the first cleat securing member is pivotally mounted on the sub-member about the first pivot axis.

14. The bicycle pedal according to claim 13, wherein
    the second pivot axis is positioned at a distance farther from a center longitudinal axis of the pedal axle than the first pivot axis.

15. The bicycle pedal according to claim 11, wherein
    the sub-member is pivotally mounted on the main pedal body by a support shaft that supports the first and second biasing members on the main pedal body.

16. The bicycle pedal according to claim 15, wherein the first cleat securing member is pivotally mounted on the sub-member about the first pivot axis.

17. The bicycle pedal according to claim 16, wherein the support shaft is disposed at a distance farther from a center longitudinal axis of the pedal axle than the first pivot axis.

18. The bicycle pedal according to claim 15, wherein
the first biasing member includes at least one first torsion spring, the support shaft extends through a coiled portion of the at least one first torsion spring; and
the second biasing member includes at least one second torsion spring, the support shaft extends through a coiled portion of the at least one second torsion spring.

19. The bicycle pedal according to claim 18, wherein the support shaft is disposed at a distance farther from a center longitudinal axis of the pedal axle than the first pivot axis.

20. The bicycle pedal according to claim 11, further comprising
a second cleat securing member coupled to the main pedal body at a location spaced from the first cleat securing member to define a cleat receiving area between the first and second cleat securing members.

21. The bicycle pedal according to claim 20, further comprising
a third cleat securing member pivotally coupled relative to the main pedal body and biased to a clamping position; and
a fourth cleat securing member coupled to the main pedal body at a location spaced from the third cleat securing member to define a cleat receiving area between the third and fourth cleat securing members.

* * * * *